US006184958B1

United States Patent
Lim et al.

(10) Patent No.: US 6,184,958 B1
(45) Date of Patent: Feb. 6, 2001

(54) METHOD OF ALIGNING AN OPTICALLY ACTIVE COMPOUND CONTAINED IN A POLYMER FILM ON A SUBSTRATE

(75) Inventors: Tong-Kun Lim; Sang-Un Choi; Hae-Sung Park, all of Seoul (KR)

(73) Assignee: Hyundai Electronics Industries Co., Ltd., Kyoungki-do (KR)

( * ) Notice: Under 35 U.S.C. 154(b), the term of this patent shall be extended for 0 days.

(21) Appl. No.: 08/936,447

(22) Filed: Sep. 24, 1997

(30) Foreign Application Priority Data

Sep. 25, 1996 (KR) .................................................. 96-42514

(51) Int. Cl.$^7$ .................................................. G02F 1/1337
(52) U.S. Cl. ............................................ 349/124; 349/136
(58) Field of Search .................................. 349/127, 129, 349/124, 136; 428/1.2

(56) References Cited

U.S. PATENT DOCUMENTS

| | | |
|---|---|---|
| 3,784,280 | 1/1974 | Bigelow ................................ 350/150 |
| 3,909,113 | 9/1975 | Stotts .................................. 350/160 |
| 5,602,661 | 2/1997 | Schadt et al. . |
| 5,705,096 | * 1/1998 | Kano et al. ......................... 252/299.4 |
| 5,846,452 | * 12/1998 | Gibbons et al. ..................... 349/129 |
| 5,889,571 | * 3/1999 | Kim et al. ............................ 349/124 |
| 5,903,330 | * 11/1999 | Funtschilling ....................... 349/129 |
| 5,909,265 | * 6/1999 | Kim ..................................... 349/129 |
| 5,912,717 | * 6/1999 | Sugiyama ............................. 349/124 |
| 5,928,561 | * 7/1999 | Bryan-Brown et al. ............. 349/127 |
| 5,936,691 | * 8/1999 | Kumar ................................. 349/124 |

FOREIGN PATENT DOCUMENTS

| | | |
|---|---|---|
| 0632311 | 1/1995 | (EP) . |
| 0684500 | 11/1995 | (EP) . |
| 9-211468 | 8/1997 | (JP) . |
| 9522075 | 8/1995 | (WO) . |

OTHER PUBLICATIONS

Kim et al,"Photo Alignment of liquid crystals using a new photopolymer", SID 96 Digest, May 1996.*
Chen et al, "Investigation of the mechanism of surface induced alignment of liquid crystals by linearly polymerized photopolymers", SID 95 Digest, May 1995.*
Wang et al, "High pretilt photoaligned polyimide substrates", SID 96 Digest, May 1996.*
Chen et al, "Mechanism of liquid crystal alignment by polyimide exposure to linearly polarized UV light", SID 96 Digest, May 1996.*
Japanese Journal of Applied Physics, Part 1 (Regular Papers & Short Notes), vol. 31, No. 7 Jul. 1992 M. Schadt et al.—"Surface–induced parallel alignment of liquid crystals by linearly polymerized photopolymers", pp. 2155–2164.
Japanese Journal of Applied Physics, Part 2 (Letters), vol. 32, No. 1 A–B, Jan. 15, 1993, Y. Imura et al.—"Alignment control of a liquid crystal on a photosensitive polyvinylalcohol film", pp. 93–96.

* cited by examiner

Primary Examiner—Kenneth Parker

(57) ABSTRACT

A method of aligning liquid crystals is disclosed. The method includes forming an optically active compound-containing polymeric film to be used as an aligning layer on a surface of each of a lower substrate and an upper substrate; irradiating circularly polarized light on the polymeric film to obliquely align the optically active compound contained relative to the substrate surface to form the aligning layer; positioning the lower substrate and the upper substrate in opposite to each other such that the polymeric film on the lower substrate is opposite to the polymeric film on the upper substrate; and pouring a liquid crystal between the substrates, thereby to obliquely align molecules of the liquid crystal due to the optically active compound aligned.

28 Claims, 17 Drawing Sheets

R1: NaO3S
R2: N(CH3)2

POLYVINYL ALCOHOL

METHOD OF ALIGNING AN OPTICALLY ACTIVE COMPOUND CONTAINED IN A POLYMER FILM ON A SUBSTRATE

BACKGROUND OF THE INVENTION

This invention relates to liquid crystals and more particularly to a method for aligning a polymeric film with polarized light without the need to mechanically rub the substrate surface, and to a method for obliquely aligning liquid crystals therewith. This invention also relates to a liquid crystal cell having an optically active compound-containing polymeric film obliquely aligned by polarized light as an aligning layer and a method of manufacturing the same.

Among flat panel display devices, a liquid crystal(LC) display device is a display device using an optical rotation property according to the orientation of liquid crystal molecules. It has a structure in which upper and lower substrates are spaced from each other by a spacer and the space between the substrates is filled with liquid crystal. Here, each of the upper and lower substrates has an aligning layer formed therein.

So as to make a liquid crystal device with uniform brightness and high contrast ratio, there is the need for aligning liquid crystal molecules in a same direction. This is because physical constants of liquid crystal varies with the orientation of liquid crystal molecules and thus a difference in the response to external force such as electric field etc., occurs. Therefore, the study on a method of controlling the alignment of liquid crystal molecules in macroscopic scales device has been widespreadly performed.

There are a homogeneous alignment, an oblique alignment, and an homeotropic alignment in basic alignment types.

Here, in the homogeneous alignment, the long axis of the liquid crystal molecule is parallel with the substrate surface and a pretilt angle $\theta$ is thus $0°$. In the oblique alignment, the pretilt angle $\theta$ is $0° < \theta < 90°$. In the homeotropic alignment, the pretilt angle $\theta$ is $90°$. The pretilt angle $\theta$ is measured as the angle that the long axis of the liquid crystal molecule makes with the surface of the substrate. In this regard, the size of the pretilt angle $\theta$ is an important variable which has an effect on a response time of the liquid crystal to external force. In the case of a twisted nematic liquid crystal cell, when the pretilt angle is $0°$, two domains, namely, a rightward twisting domain and a leftward twisting domain in the liquid crystal, occur. Accordingly a disclination occurs and contrast ratio is therefore attenuated.

In general, so as to align the liquid crystal poured between upper and lower substrates in a same direction, the alignment layers are formed on the substrates, respectively. Examples, the conventional method of forming the alignment layer for liquid crystal includes a SiO2 depositing method, a coating method, and a rubbing technique using an organic polymer, etc.. The rubbing technique using a polyimide polymer film as an aligning layer has been most widely applied.

The method of aligning the liquid crystal in accordance with the rubbing technique comprises coating polyimide films as aligning layers on the surfaces of upper and lower substrates, respectively which TFT arrays and color filters, respectively are formed; curing the coated polyimide films; rubbing the polyimide films with rubbing cloth, rabbit fur, etc., to form grooves in a same direction on the films; and aligning liquid crystalline molecules in a same direction along the grooves. Here, the alignment of a liquid crystal is controlled according to the application of LCD devices or the direction of main viewing angle.

This technique has inherent problems, however, in that rubbing creates both electrical damage and mechanical damage in TFT arrays placed below an aligning layer in a liquid crystal cell. In addition, owing to static charges and dust particles, the lifetime of LCD devices is shortened.

SUMMARY OF THE INVENTION

Accordingly, it is one object of this invention to provide a method of aligning an optically active compound-containing polymeric film on a substrate without rubbing with polarized light.

It is another object of this invention to provide a method for aligning liquid crystals using circularly polarized light without the need to mechanically rub the surface of a substrate.

It is further another object of this invention to provide a method for aligning liquid crystals by obliquely aligning an optically active compound contained in a polymeric film to be used as an aligning layer according to an incident angle of polarized light and then by controlling a pretilt angle according to an aligning angle of the optically active compound.

It is still object of this invention to provide a method of forming a liquid crystal cell capable of preventing a TFT array placed below an aligning layer from electrical and mechanical damages, through oblique alignment with polarized light.

To achieve these objects, a method of aligning an optically active compound-containing polymeric film on a substrate comprises irradiating circularly polarized light onto the optically active compound-containing polymeric film and thus obliquely aligning the optically active compound. The aligning angle of the optically active compound varies with an incident angle of the circularly polarized light incident to the polymeric film. The polymeric film contains an azoic dye as the optically active compound. Preferably, the polymeric film is polyvinyl alcohol film which contains methyl orange as the optically active compound.

A method of aligning liquid crystals comprises the steps of:(a)forming an optically active compound-containing polymeric film to be used as an aligning layer on a surface of each of a lower substrate and an upper substrate; (b) irradiating circularly polarized light on the polymeric film to obliquely align the optically active compound contained relative to the substrate surface to form the aligning layer; (c) positioning the lower substrate and the upper substrate in opposite to each other such that the polymeric film on the lower substrate is opposite to the polymeric film on the upper substrate; and (d) pouring a liquid crystal between the substrates, thereby to obliquely align molecules of the liquid crystal due to the optically active compound aligned.

Another method of aligning liquid crystals comprises the steps of: (a) forming an optically active compound-containing polymeric film to be used as an aligning layer on a surface of each of a lower substrate and an upper substrate; (b) positioning the lower substrate and the upper substrate in opposite to each other such that the polymeric film on the lower substrate is opposite to the polymeric film on the upper substrate; (c) pouring a liquid crystal between the substrates; (d) irradiating circularly polarized light on the polymeric film to obliquely align the optically active compound relative to the substrate surface, thereby to obliquely align molecules of the liquid crystal in accordance with the optically active compound aligned.

A method of fabricating a liquid crystal cell by aligning liquid crystal comprises the steps of: (a) forming an optically active compound-containing polymeric film to be used as an aligning layer on a surface of each of a lower substrate and an upper substrate; (b) irradiating polarized light on the polymeric film to obliquely align the optically active compound relative to the substrate surface; (c) placing the lower and upper substrates such that the lower and upper substrates are opposite to each other with a selected space; (d) sealing the lower and upper substrates with a spacer placed between the substrates; and (e) pouring a liquid crystal between the substrates, thereby to obliquely align the liquid crystal such that the liquid crystal have a certain selected pretilt angle in accordance with the aligning angle of the optically active compound.

Another method of fabricating a liquid crystal cell by aligning liquid crystal comprises the steps of: (a) forming an optically active compound-containing polymeric film to be used as an aligning layer on a surface of each of a lower substrate and an upper substrate; (b) placing the lower and upper substrates such that the lower and upper substrates are opposite to each other with a selected space;(c)sealing the lower and upper substrates with a spacer placed between the substrates; (d) irradiating polarized light on the polymeric film to obliquely align the optically active compound relative to the substrate surface; and (e) pouring a liquid crystal between the substrates, thereby to obliquely align the liquid crystal such that the liquid crystal have a certain selected pretilt angle in accordance with the aligning angle of the optically active compound.

Further another method of fabricating a liquid crystal cell by aligning liquid crystal comprises the steps of: (a) forming an optically active compound-containing polymeric film to be used as an aligning layer on a surface of each of a lower substrate and an upper substrate; (b) placing the lower and upper substrates such that the lower and upper substrates are opposite to each other with a selected space; (c) sealing the lower and upper substrates with a spacer placed between the substrates; (d) pouring the liquid crystal between the substrates; and (e) irradiating polarized light on the polymeric film to obliquely align the optically active compound relative to the substrate surface, thereby to obliquely align the liquid crystal such that the liquid crystal have a certain selected pretilt angle in accordance with the aligning angle of the optically active compound.

In this invention, an pretilt angle of the liquid crystal is controlled by an aligning angle of the optically active compound the aligning angle of which is controlled by an incident angle of circularly polarized light. The optically active compound is an azoic dye. The aligning layer is preferably a polyvinyl alcohol film which contains methyl orange as the azoic dye. The step of forming the methyl orange-containing polymeric film on the substrate surfaces comprises the steps of: dissolving a polyvinyl alcohol powder in distilled water to prepare a solution; adding a selected amount of methyl orange into the solution; pouring the solution into which the methyl orange is added onto the substrate surfaces thereby to coat the substrate surfaces; and baking the coated substrates to form the polymeric films. The pretilt angle of the liquid crystal molecule varies with the baking time of the substrates in the baking step, A liquid crystal cell comprises: (a) a lower substrate on which a lower polymeric aligning layer containing an optically active compound obliquely aligned relative to the lower substrate is formed; (b) an upper substrate on which a upper polymeric aligning layer containing an optically active compound obliquely aligned relative to the upper substrate is formed;(c) a spacer for placing the lower and upper substrates such that the substrates are separated from each other to form a space between them; and (d) a liquid crystal poured into the space between the lower substrate and the upper substrate, the liquid crystal being obliquely aligned such that it has a certain selected pretilt angle relative to the substrate surfaces according to the aligning angle of the optically active compound. Preferably the optically active compound is an azoic dye. The aligning layer is preferably a polyvinyl alcohol film which contains methyl orange as the azoic dye.

In this invention, the liquid crystal molecules are obliquely aligned with a selected certain pretilt angle, by irradiating circulary polarized light onto an optically active compound-containing polymeric film to be used as an aligning layer without the need to rub the substrate surfaces. Circularly polarized light includes elliptically polarized light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3(A) shows alignment processes when P-polarized pump wave is irradiated as an incident light.

FIG. 3(B) shows alignment processes when S-polarized pump wave is irradiated as an incident light.

In FIG. 4(A), P-polarized pump wave as an incident light is perpendicularly irradiated to the polymeric film. In FIG. 4(B), P-polarized pump wave as incident light is obliquely-irradiated to the polymeric film.

FIG. 5(A) shows a transmittance when an incident angle of pump wave is 0°.

FIG. 5(C) shows a transmittance when an incident angle of pump wave is 60°.

FIG. 7(A) shows a transmittance when a probe beam is irradiated parallelly relative to pump wave.

FIG. 7(B) shows a transmittance when a probe beam is irradiated perpendicularlly relative to pump wave.

DETAILED DESCRIPTION OF THE INVENTION

Figure 1:
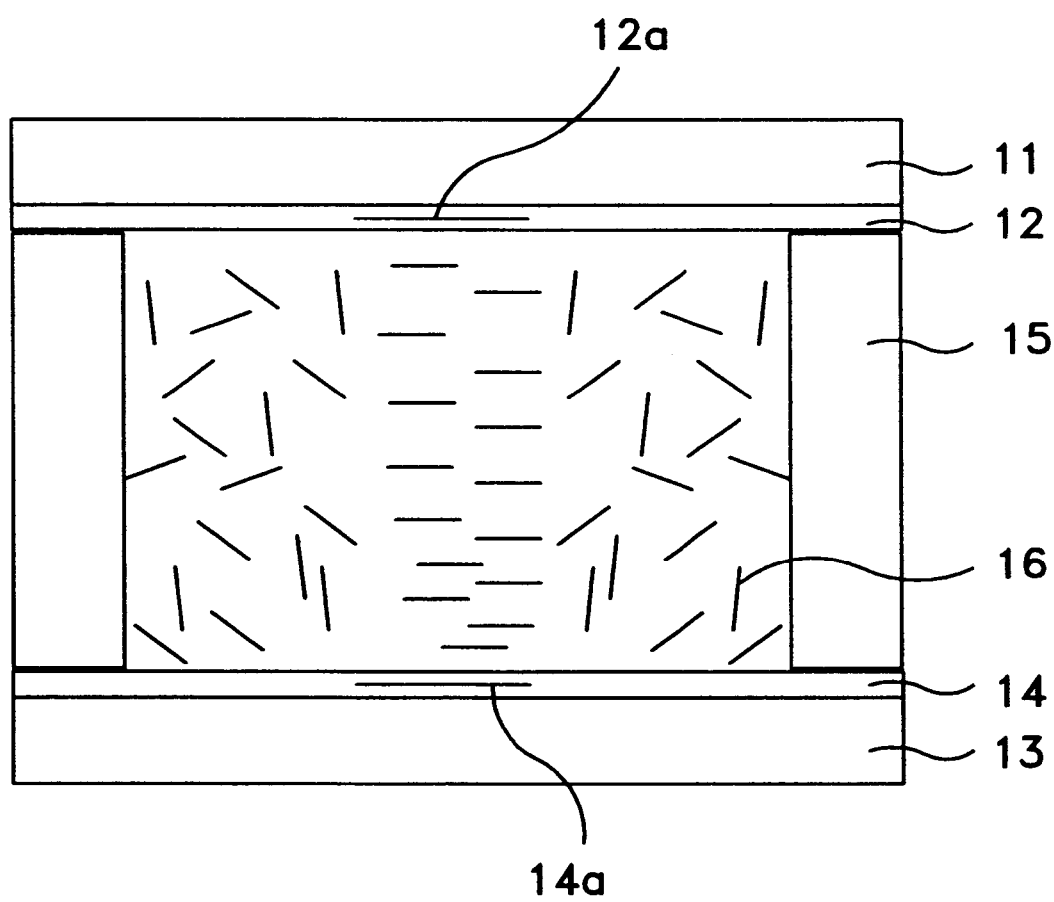
FIG. 1 is a schematic representation of a liquid crystal cell according to one embodiment of this invention.

A schematic representation of a liquid crystal cell according to an embodiment of this invention is shown in FIG. 1. Referring to FIG. 1, the liquid crystal cell comprises lower and upper substrates 11 and 13. Aligning films 12 and 14 are formed on the lower and upper substrates 11 and 13, respectively. The substrates 11 and 13 are separated from each other by a spacer 15 with a selected distance. Liquid crystal 16 is poured into a space between the lower and upper substrates 11 and 13.

In this embodiment, an azoic dye-containing polymeric film is used as an aligning layer 12 or 14. An azoic dye acts as an optically active compound. One preferable example of an azoic dye is methyl orange with a rotation angle of benzene ring being 90°. Polyvinyl alcohol film is used as a polymeric film which functions a matrix.

Hereinafter, a method of forming a liquid crystal cell according to an embodiment of this invention will be described.

Firstly, as a polymeric film, polyvinyl alcohol film containing methyl orange as an optically active compound are formed on each surface of the lower and upper substrates. In this regard, The methyl orange-containing polyvinyl alcohol film was formed as follows: The polyvinyl alcohol powder was dissolved in distilled water to form a solution and a proper amount of methyl orange was added into this solution. Then, the solution containing methyl orange is poured onto the substrates 11 and 13, respectively, to coat the surfaces of substrates 11 and 13. The coated substrates 11 and 13 were placed in an oven for four or five days and a methyl orange-containing polyvinyl alcohol film as an aligning layer was thus formed.

Following the step of forming polymeric aligning layers on the surfaces of the lower and upper substrates 11 and 13, the light is irradiated onto the polymeric films, to obliquely align methyl orange contained in them relative to the substrate surfaces. In this embodiment, the light for obliquely aligning a liquid crystal with a selected certain angle is circularly polarized light and the lower and upper substrates 11 and 13 are transparent glasses.

The lower and upper substrates 11 and 13 are positioned separately from each other with a spacer 15 being between them and then are sealed. A liquid crystal is poured into a space between the substrates 11 and 13. Accordingly, a liquid crystal cell is provided. At this time, the liquid crystal poured into the space between the substrates 11 and 13 is obliquely aligned with a selected value of pretilt angle according to oblique-alignment of methyl orange contained in a polymeric film.

In this embodiment, methyl orange-containing polymeric films to be used as an aligning layers are formed on the surfaces of lower and upper substrates, respectively. Following the formation of the polymeric films on the surfaces of the substrates, the circularly polarized light is irradiated onto the polymeric films. Accordingly, the methyl orange molecules contained in the polymeric films are obliquely aligned. These methyl orange molecules in turn align the liquid crystal molecules obliquely.

In another embodiment, methyl orange-containing polymeric films to be used as an aligning layers are formed on the surfaces of lower and upper substrates, respectively. After the sealing of the lower and upper substrates with a space between them, circularly polarized light is irradiated onto the polymeric films, respectively to align obliquely the methyl orange contained in the polymeric films, and liquid crystal is then poured into the space between the lower and upper substrates. At this time, the liquid crystal poured into the space between the substrates, is obliquely aligned owing to the oblique alignment of the methyl orange molecules.

In further another embodiment, methyl orange-containing polymeric films to be used as aligning layers are formed on the surfaces of lower and upper substrates, respectively. After the sealing of the lower and upper substrates with a space between them, liquid crystal is poured into the space between the lower and upper substrates. Following the pouring of the liquid crystal into the space, circularly polarized light is irradiated onto the polymeric films to align methyl orange molecules contained in the polymeric films obliquely. These methyl orange molecules align the liquid crystal obliquely.

Hereinafter, the photo characteristics of the methyl orange-containing polyvinyl alcohol film to be used as the aligning layer will be described.

First, optical characteristics of the methyl orange-containing polyvinyl alcohol film with respect to linearly polarized light will be described with reference to FIGS. 2 to 5.

Figure 2:
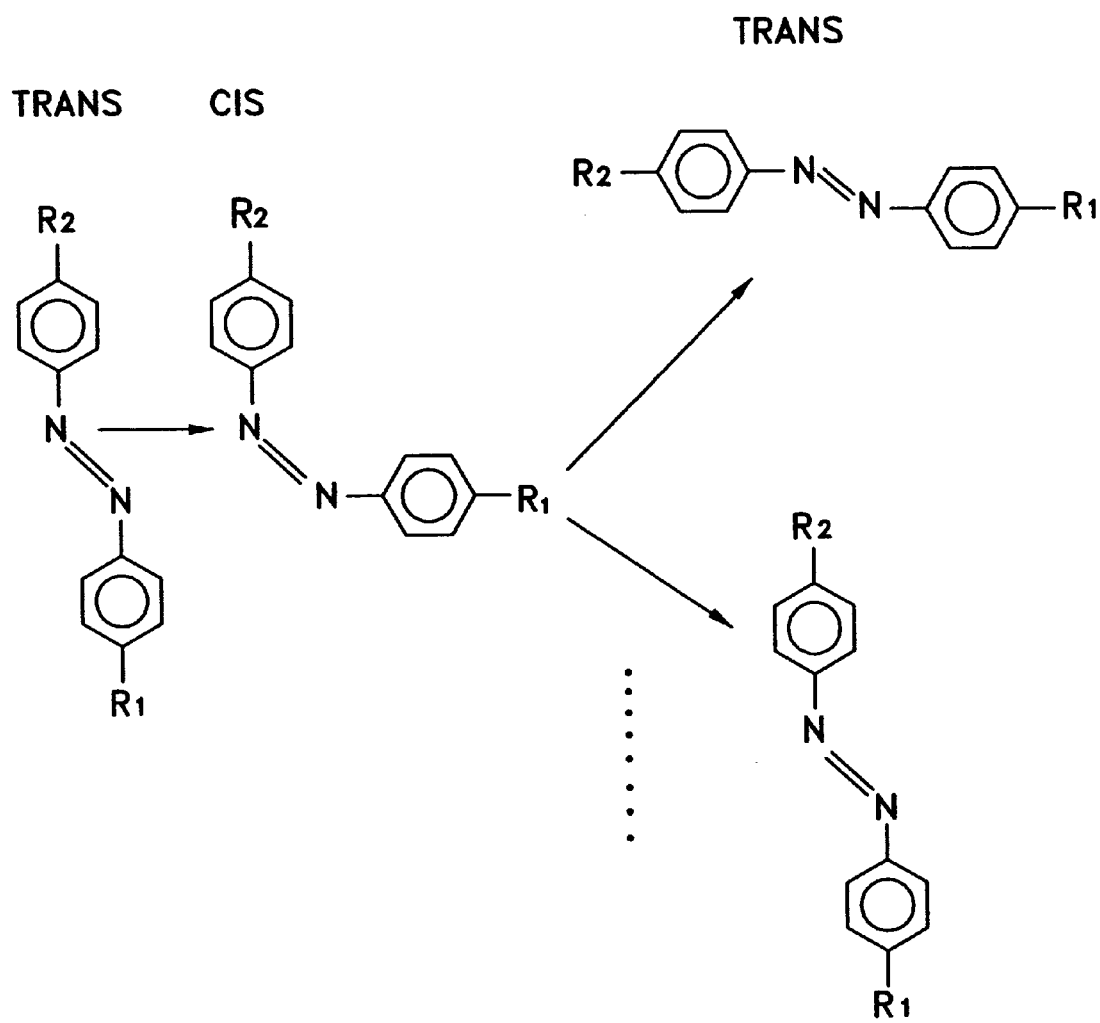
FIG. 2 shows a re-orientation process of an azoic dye contained in a polymeric film according to an photoinduced isomerization in a liquid crystal cell of this invention.
Figure 2:
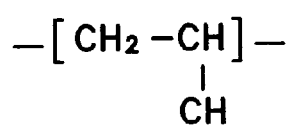

As shown in FIG. 2, when irradiated by linearly polarized light, a methyl orange which is used as an azoic dye is transformed from the trans state in which methyl orange molecules are stable, to the cis state in which the molecules will be 90° bend to the original molecular axis by Malus' law, and the methyl orange molecules in the cis state then is back transformed to in the trans state by thermal relaxation etc. That is to say, the methyl orange molecules will be subject to photo isomerization.

In this case, when methyl orange molecules in the polyvinyl alcohol film is sufficiently irradiated by light polarized parallelly with the molecular axis thereof i. e., by light of P-pump wave polarized in the y-direction, as shown in FIG.

3(A), the methyl orange molecule 12b or 14b lie in the xz plane which is perpendicular to y direction which is the polarization direction of the light due to the repetition of the trans-cis-trans transformation process by photo isomerization.

Figure 3A:
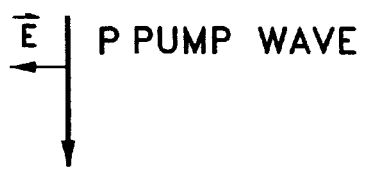
FIG. 3(A) and FIG. 3(B) show alignment processes of methyl orange as azoic dye contained in a polymeric film which is an aligning layer in a liquid crystal cell of this invention of FIG. 1.
Figure 3A:
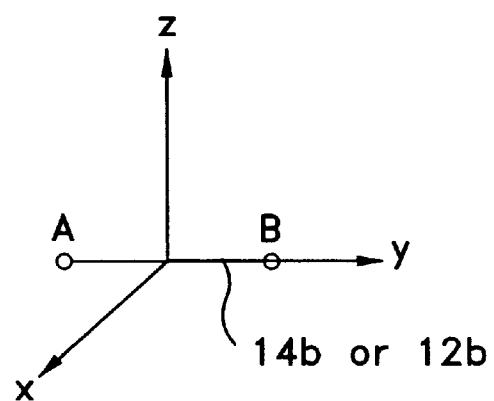
Figure 3A:
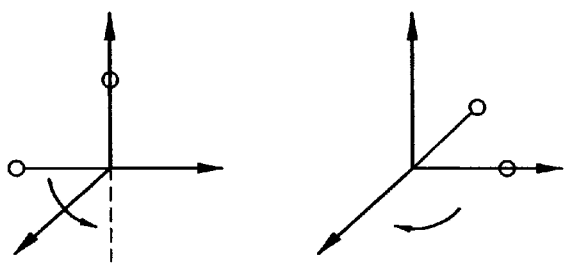
Figure 3A:
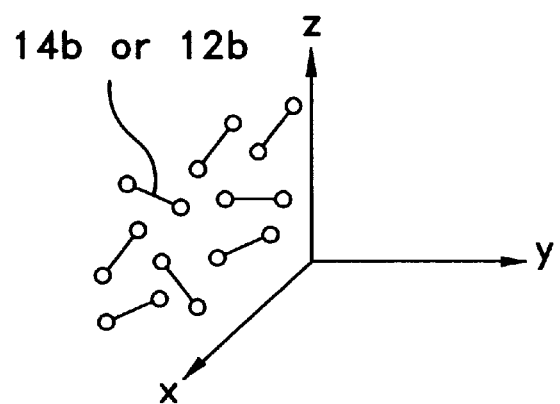
Figure 3B:
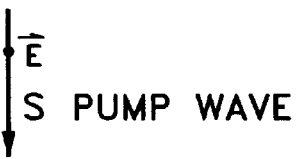
Figure 3B:
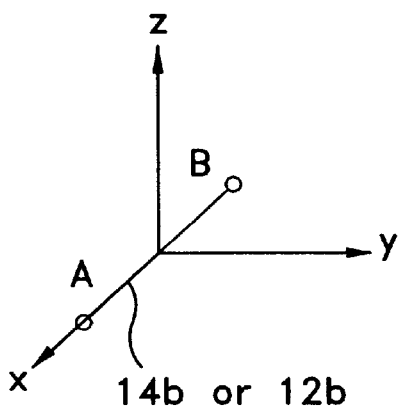
Figure 3B:
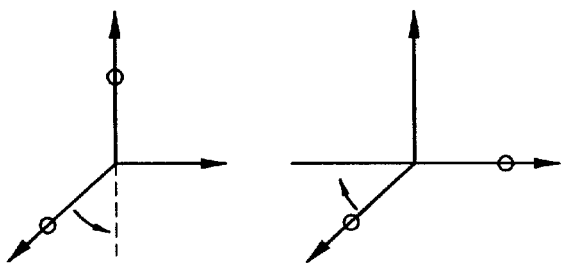
Figure 3B:
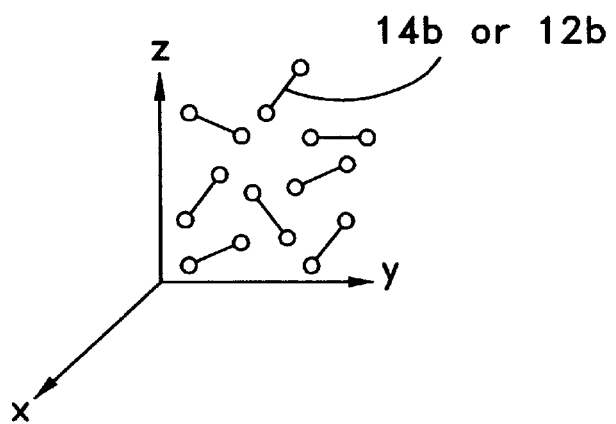

In addition, when methyl orange molecules in the polyvinyl alcohol film is sufficiently irradiated by light polarized perpendicular to the molecular axis thereof i. e., by light of S-pump wave polarized in the x-direction, as shown in FIG. 3(B), the methyl orange molecule 12b or 14b lie in the yz plane which is perpendicular to x direction which is the polarization direction of the light, like those described above.

That is to say, when linearly polarized light is irradiated to the methyl orange molecules-containing polyvinyl alcohol film, methyl orange molecules lie in the xz plane though S-pump wave the electric field of which is perpendicular to the incident plane is obliquely irradiated. Moreover, it is noted that when P-pump wave is obliquely irradiated, the plane in which methyl orange molecules lie is oblique with respect to the substrate surface.

Figure 4A:
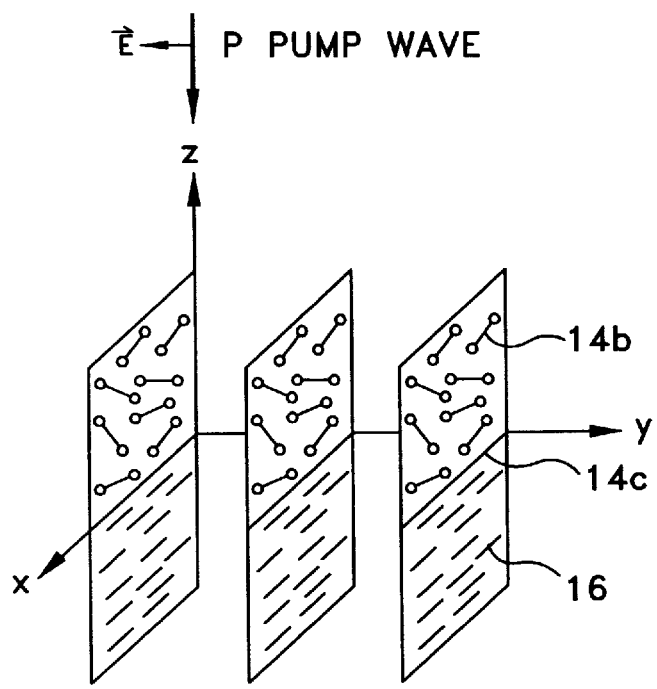
FIG. 4(A) and FIG. 4(B) show orientation state of liquid crystal and an azoic dye contained in the polymeric film when P-polarized pump wave is irradiated, in a liquid crystal cell of this invention of FIG. 1.
Figure 4B:
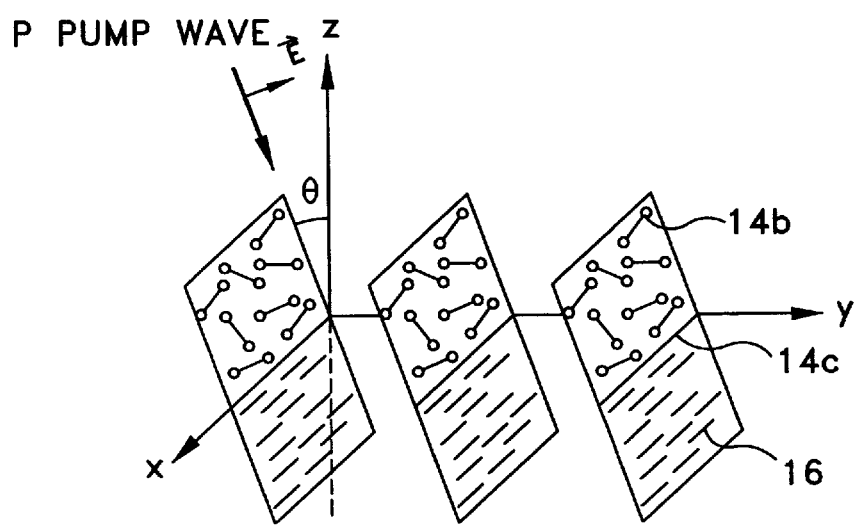

Therefore, when the liquid crystal cell first is first prepared by irradiating P-pump wave onto the methyl orange molecules-containing polyvinyl alcohol film obliquely such that incident angle θ which is formed by the normal line of the substrate surface and the propagation direction of light has a selected value, thereby to align the methyl orange molecules obliquely with respect to the substrate surface and the liquid crystal is then poured into the space between the substrate, the liquid crystal is arranged parallelly to the corner of the plane, in the same way as in the case of FIG. 4(A) that the pump wave is irradiated perpendicularly to the substrate surface though the plane in which the methyl orange molecules lie is oblique with respect to the substrate surface, as shown in FIG. 4 (B). That is to say, it is noted that liquid crystal is homogeneously oriented without any pretilt angle. In FIGS. 4(A) and 4(b), a reference numeral 14b represents methyl orange molecules, a reference numeral 14c the surface of polyvinyl alcohol film, and a reference numeral 16 the liquid crystal molecules.

Figure 5A:
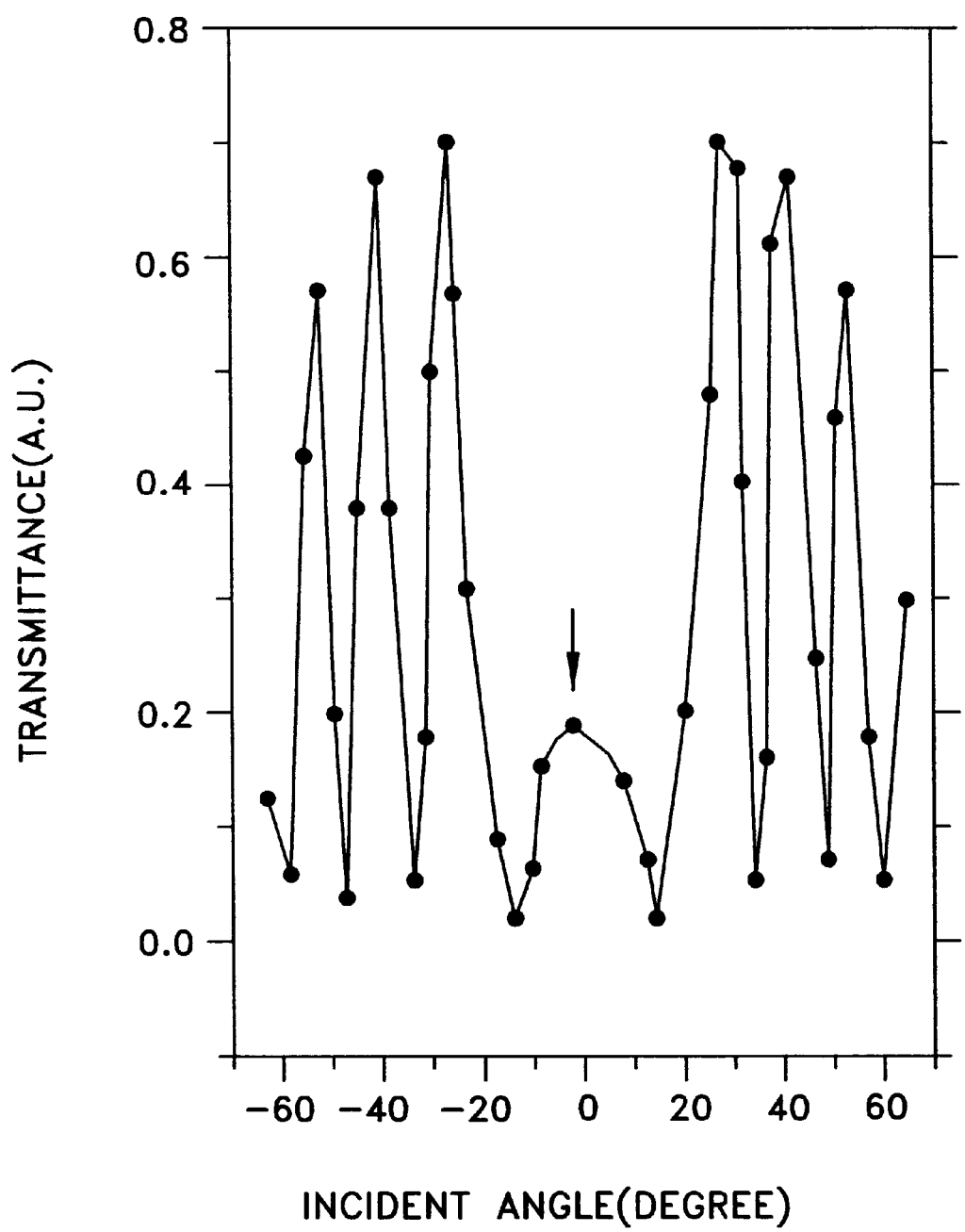
FIG. 5(A) and FIG. 5(C) each shows transmittance according to incident angle of P-polarized pump wave so as to measure a pretilt angle of a liquid crystal in accordance with an orientation of the azoic dye, in a liquid crystal cell of this invention of FIG. 1.
Figure 5B:
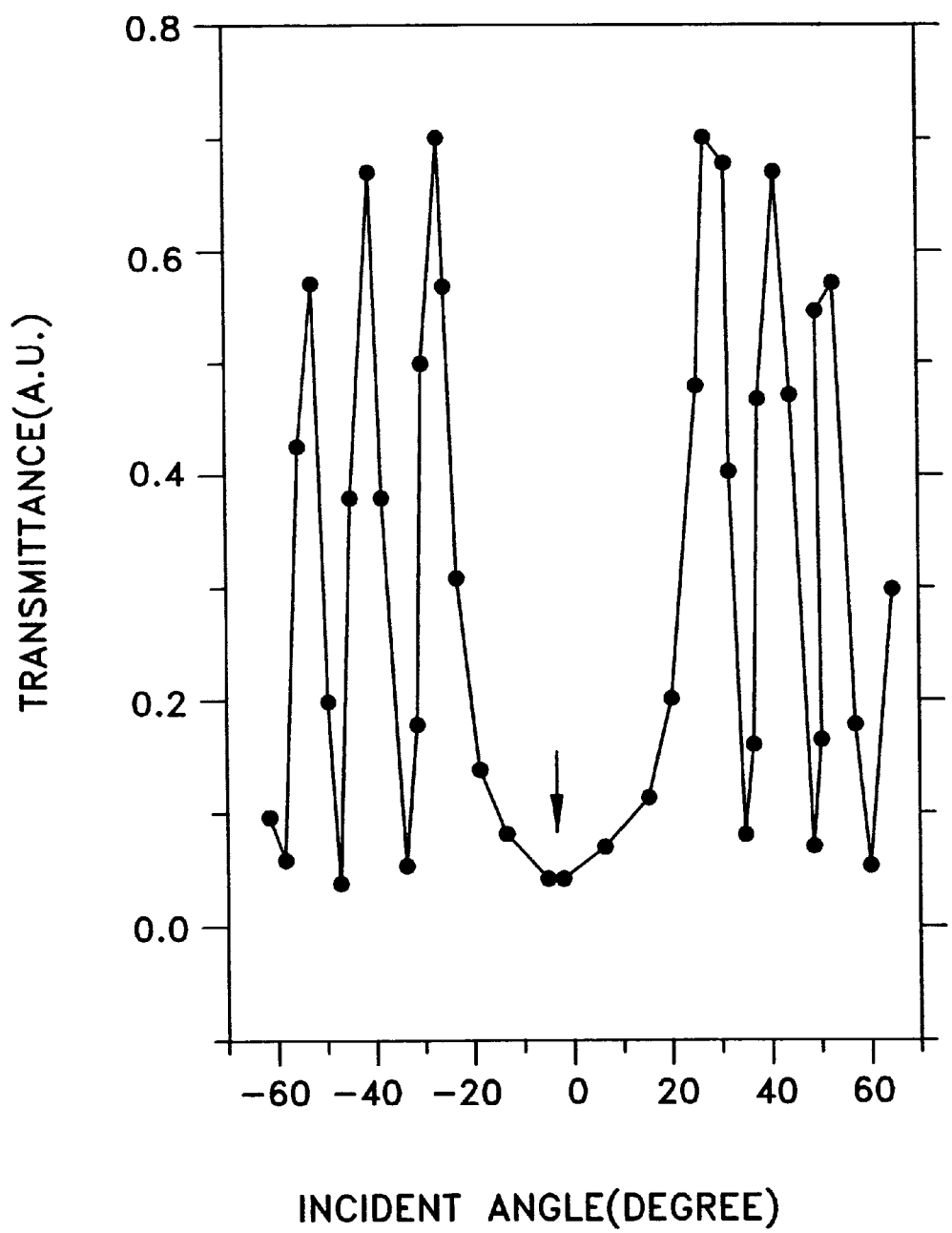
FIG. 5(B) shows a transmittance when an incident angle of pump wave is 3°.
Figure 5C:
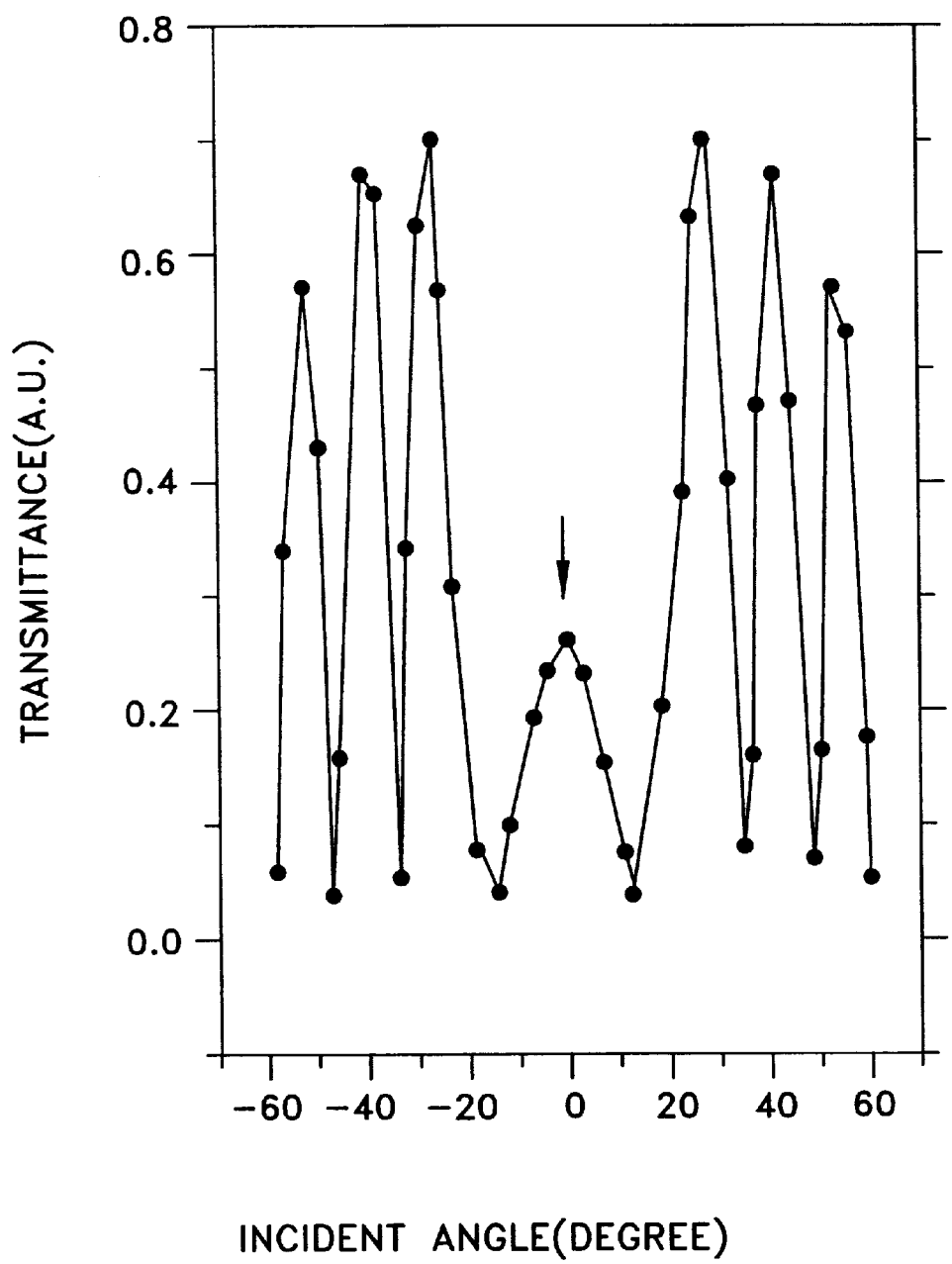

In addition, in the case that after methyl orange molecules are aligned by irradiating P-pump wave onto the methyl orange-containing polyvinyl alcohol film with incident angles being 0°, 30° and 60°, respectively, a liquid crystal cell is prepared, the measurement of the pretilt angle in the crystal rotation method widely used shows that symmetry angles of all transmittance curves are 0°, respectively as shown in FIGS. 5(A) to 5(B). It is clear that the liquid crystal molecules are homogenously oriented with no pretilt angle.

As described above, in the alignment of liquid crystal, it is hardly useful to homogenously align the liquid crystal molecules with no pretilt angle because pretilt angle of liquid crystal is the important factor to contrast ratio and response time of liquid cell.

We have found that, as liquid crystal is aligned parallelly with the corner of the plane in which methyl orange molecules oriented by linearly polarized light lie, liquid crystal is obliquely aligned with a selected value of pretilt angle when anisotropically orienting the molecules lain in the plane.

On the basis of the above fact, we have used circularly polarized light as pump wave. That is to say, when circularly polarized light which has both S-wave portion and P-wave portion is irradiated, methyl orange molecules are oriented according to the propagation direction of light. When circularly polarized pump wave is obliquely incident with a selected value of incident angle, methyl orange molecules are obliquely oriented with respect to the substrate surface. Eventually, liquid crystal molecules are obliquely aligned with a selected value of pretilt angle owing to anisotropy of the orientation of the methyl orange molecules.

In an embodiment of this invention, optical characteristics of the methyl orange-containing polyvinyl alcohol film when circularly polarized light is used as a light source will be described with reference to FIGS. 6 to 12.

In fabricating liquid crystal cell according to this invention, when circularly polarized light is irradiated on the methyl orange-containing polyvinyl alcohol film, the methyl orange molecules contained in polyvinyl alcohol film are oriented in a propagation direction of light, i. e., z direction which is common axis between yz plane and xz plane. Here, on yz plane is methyl orange molecules oriented with the S-pump wave and on xz plane methyl orange molecules oriented with the P-pump wave.

Figure 6:
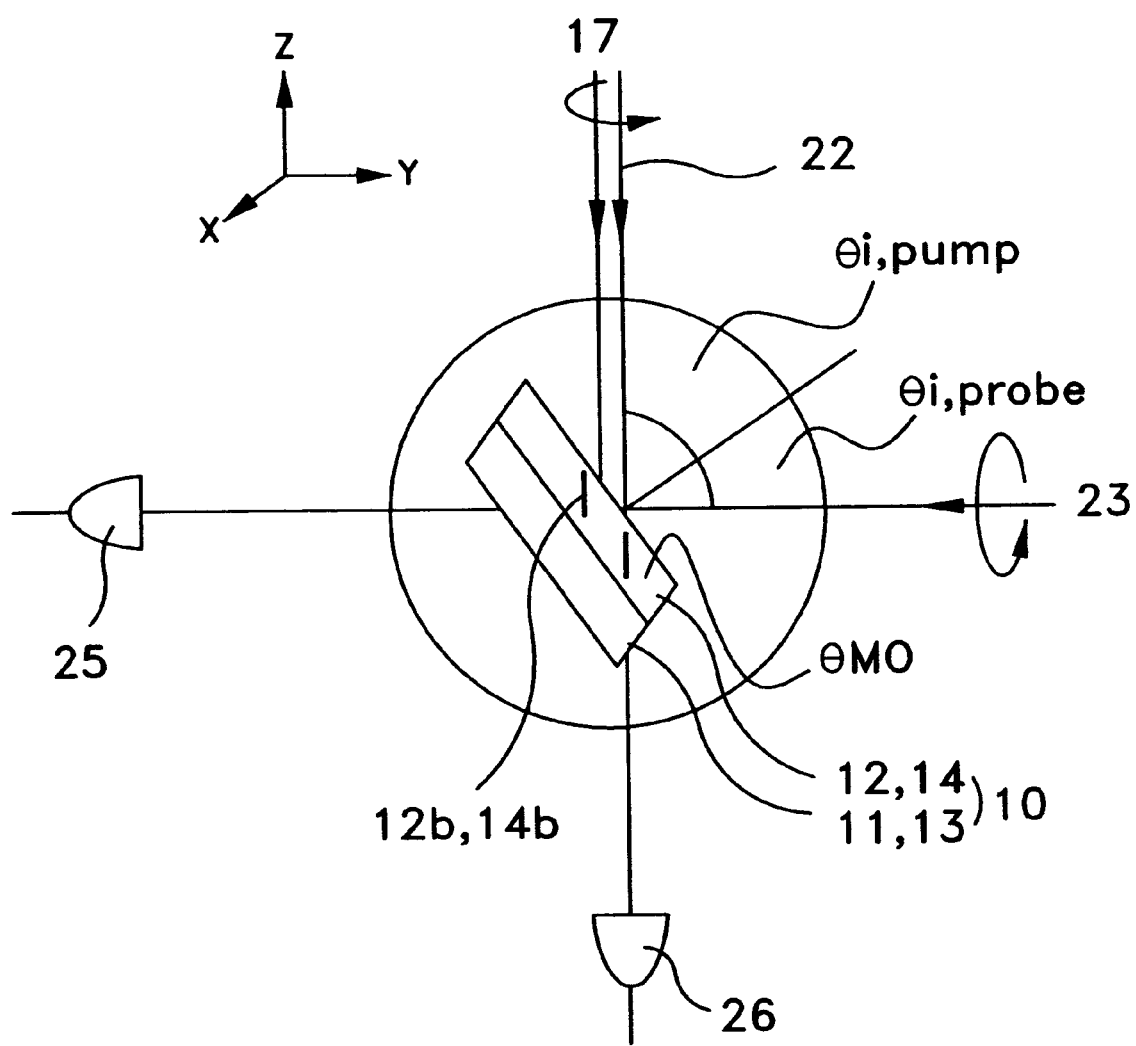
FIG. 6 shows a schematic representation of an experimental apparataus for measuring an orientation state of methyl orange contained in a polymeric film when circularly polarized light is irradiated onto the polymeric film, in a liquid crystal cell according to an embodiment of this invention.

FIG. 6 shows a schematic representation of an experimental apparatus for finding the fact that methyl orange molecules are oriented in the propagation direction of the circularly polarized light when circularly polarized light is irradiated onto the methyl orange molecules-containing polyvinyl alcohol film.

Referring to FIG. 6, the sample films 10 are first immersed in a Hexane solution( refractive index nD=1.37) 21 so as to match refractive indexes of the methyl orange-containing polyvinyl alcohol films. Here, the samples were prepared by forming a methyl orange-containing polyvinyl alcohol film to be used as an aligning layer on the substrates 11 and 13. Moreover, an Ar+; laser(wavelength; 488 nm) with a diameter of 4 mm is used as pump wave 17 as well as probe beams 22 and 23. Here, any light may be used as circularly polarized light as long as the light lie in an absorption region of an optically active compound-containing polymeric aligning layer, for example a methyl orange-containing polyvinyl alcohol film. The Ar+; laser which is used as pump wave 17 has the light intensity of 165 mW/cm². A ratio of the probe beam intensity to the pump beam intensity is 1/1000.

Circularly polarized pump wave 17 is irradiated onto the samples 10 which are immersed in the Hexane solution 21 in −z direction, as shown in FIG. 6. Probe beam 22 parallel with a propagation direction of pump wave 17 and probe beam 23 perpendicular to a propagation direction thereof, respectively is irradiated onto the sample 10. At this time, an incident angle of pump wave is 60*. Polarization directions of the probe beams 22 and 23, respectively are rotated in the arrow direction. Transmittance according to angle of polarization is detected by photodiodes 25 and 26 which are placed in x-axis direction and y-axis direction, respectively. The result is shown in FIGS. 7(A) and (B).

Figure 7A:
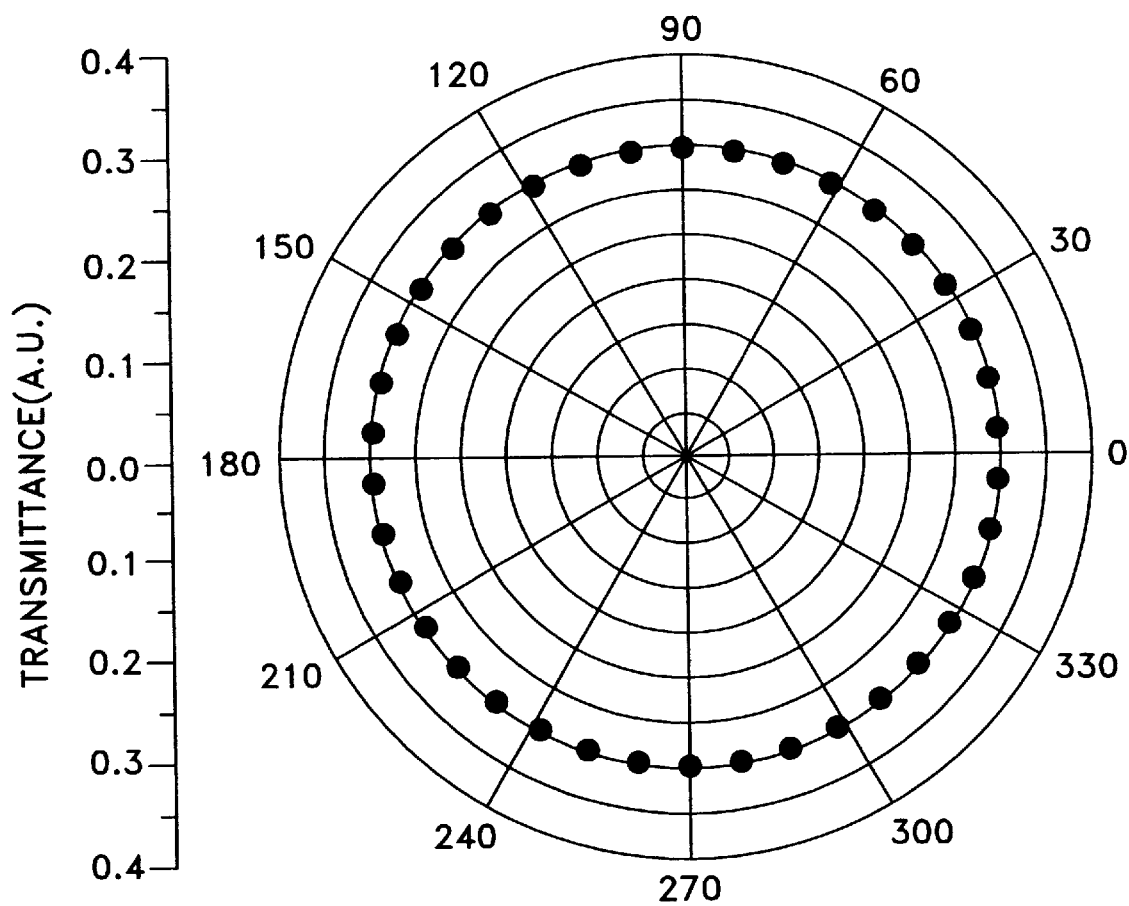
FIGS. 7(A) and 7(B) each shows transmittance according to a polarization angle of probe beam measured by the experimental apparatus in FIG. 1.
Figure 7B:
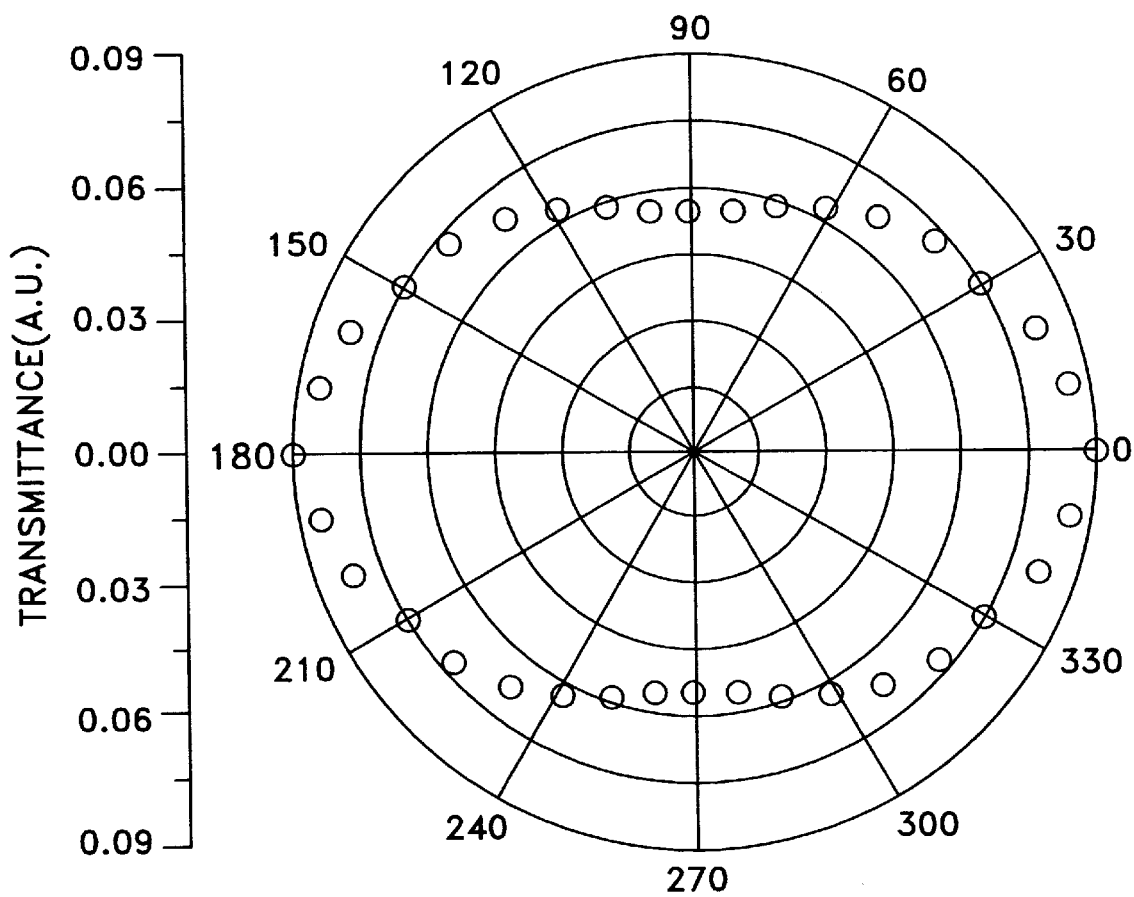

As shown in FIG. 7(A), in the case that the propagation direction of circularly polarized pump wave is the same as that of probe beam, transmittance according to polarization angle of probe beam is symmetry. As shown in FIG. 7(B), in the case that the propagation direction of circularly polarized pump wave is perpendicular to that of probe beam, transmittance according to polarization angle of probe beam is asymmetry. From this fact, it is clear that methyl orange molecules contained in polyvinyl alcohol film respond to circularly polarized light thereby to orient parallelly with the propagation direction of light, i. e., z axis.

To confirm the orientation state of methyl orange molecules, as shown in FIG. 6, circularly polarized pump wave is obliquely irradiated with incident angle(θi, pump) being 60. In addition, Probe beam is selected as P-wave and S-wave, respectively. The difference in transmittances between before and after pumping according to an incident angle of probe beam($\theta$i, probe) is measured.

Figure 8A:
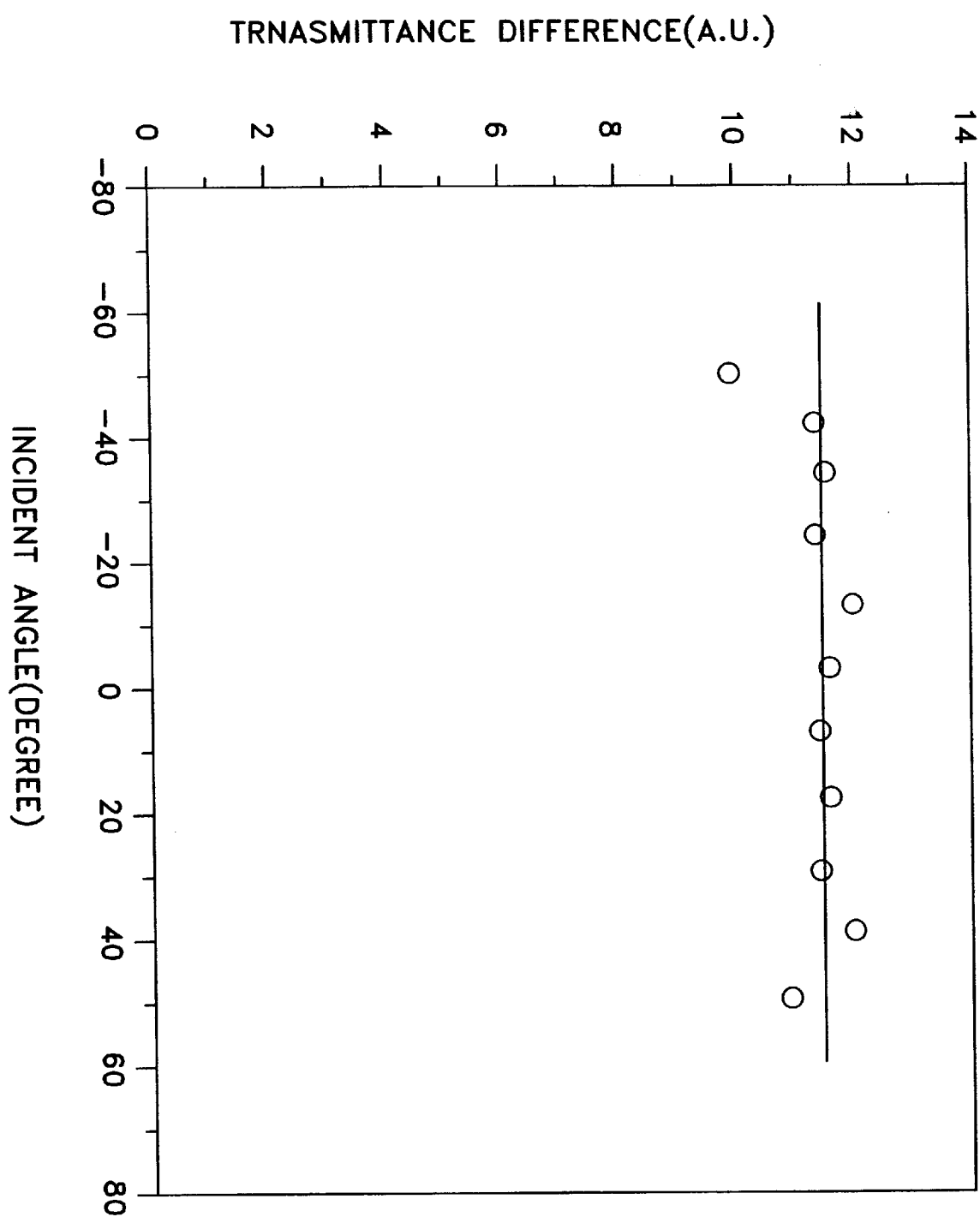
FIGS. 8(A to 8(B) each shows a transmittance difference of both pre-pumping and post-pumping according to an incident angle of S-polarized probe beam and P-polarized probe beam, respectively, measured by the experimental apparatus.

From FIG. 8(A) showing the case that probe beam is S-wave, it is noted that the transmittance difference according to incident angle does not vary and methyl orange molecules are therefore oriented perpendicularly to electric field of S-wave.

Figure 8B:
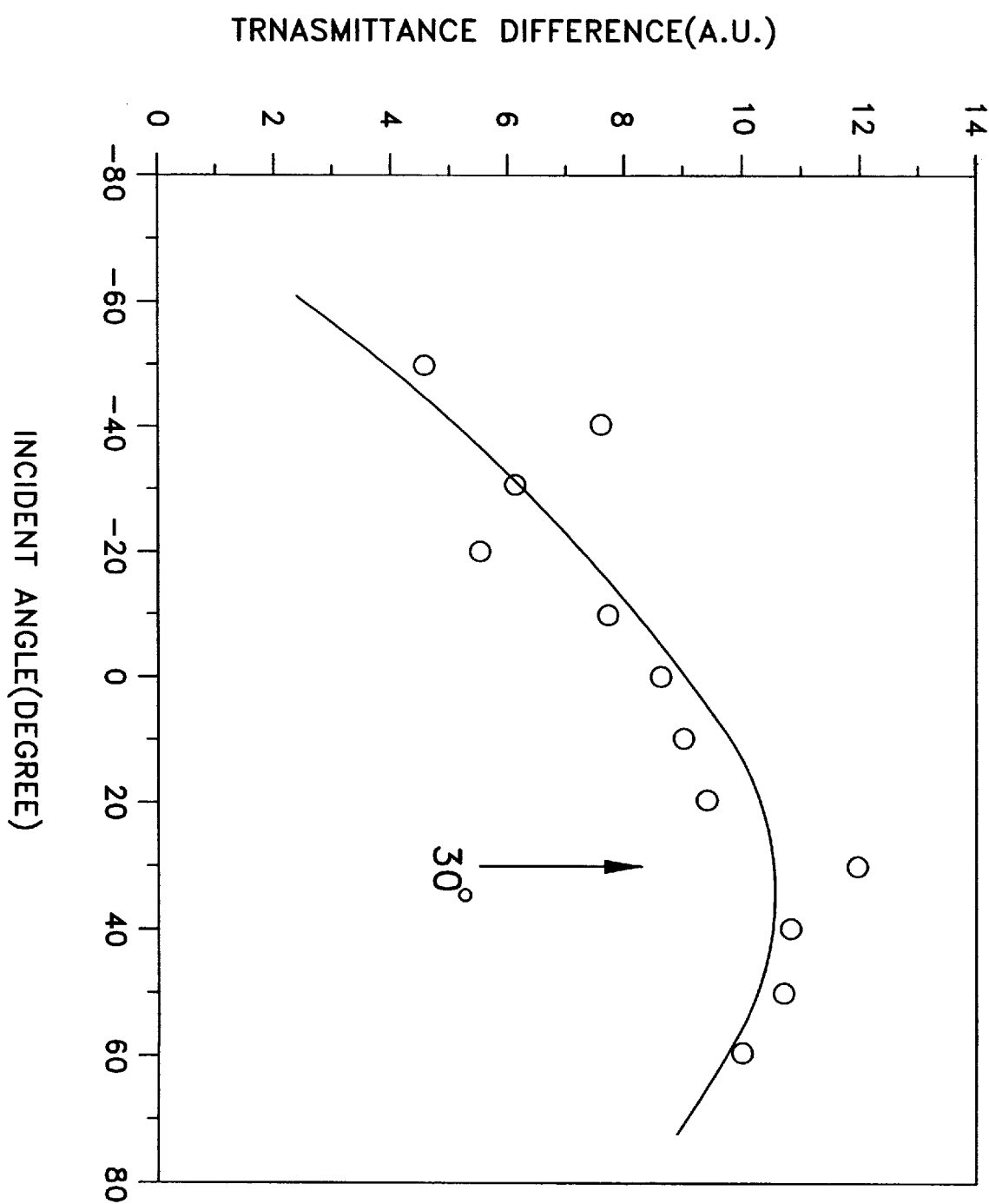

From FIG. 8(B) showing the case that probe beam is P-wave, it is noted that the transmittance difference according to incident angle has increased gradually up to incident angle of 30 * and decreased after that point, in some other way than in the case of S-wave. This shows that methyl orange molecules are oriented parallelly with the incident plane and the absorption occurs according to Malus' law. In addition, it means that as the difference of transmittance is maximum when incident angle is 30°, the methyl orange molecules are oriented with an inclination angle of 60° with respect to a normal line of the substrate surface.

From the above facts it means that methyl orange molecules are oriented parallelly with the propagation direction of circularly polarized pump wave according to this light.

From optical characteristics of methyl orange-containing polyvinyl alcohol film used as an aligning layer, relative to linearly polarized light and circularly polarized light, in this invention circularly polarized light as a light source is used so as to align liquid crystal without the need to rub the substrate surface.

That is to say, in fabricating a liquid crystal cell according to embodiment of this invention, an optically active compound-containing polymeric film such as azoic dye-containing polyvinyl alcohol film is used. Circularly polarized light as a light source is used as an aligning layer. However, as an aligning layer of liquid crystal cell, other optically active compound-containing polymeric film than azoic dye-containing polymeric film may be used.

In addition, in fabricating a liquid crystal cell according to the embodiment of this invention, first, an optically active compound-containing polymeric film to be used as an aligning layer is formed on a surface of each of a lower substrate and an upper substrate. Then, circularly polarized light is irradiated onto the polymeric film thereby to obliquely align the optically active compound relative to the substrate surface. The lower and upper substrates are placed such that the lower and upper substrates are opposite to each other with a selected space, and then the lower and upper substrates are sealed with a spacer placed between the substrates. Liquid crystal is poured into the space between the substrates, thereby to obliquely align the liquid crystal such that the liquid crystal have a certain selected pretilt angle in accordance with the aligning angle of the optically active compound. However, after the sealing of the substrates, an optically active compound contained in an polymeric aligning layer may be obliquely aligned with circularly polarized light, and then liquid crystal may be poured into the space. Following the step of pouring liquid crystal, the liquid crystal may be obliquely aligned. In addition, after the substrates are sealed and liquid crystal is then poured, liquid crystal may be obliquely aligned by obliquely aligning an optically active compound contained in an polymeric aligning layer with circularly polarized light. In this invention, the elliptically polarized light may be substituted for circularly polarized light.

Figure 9:
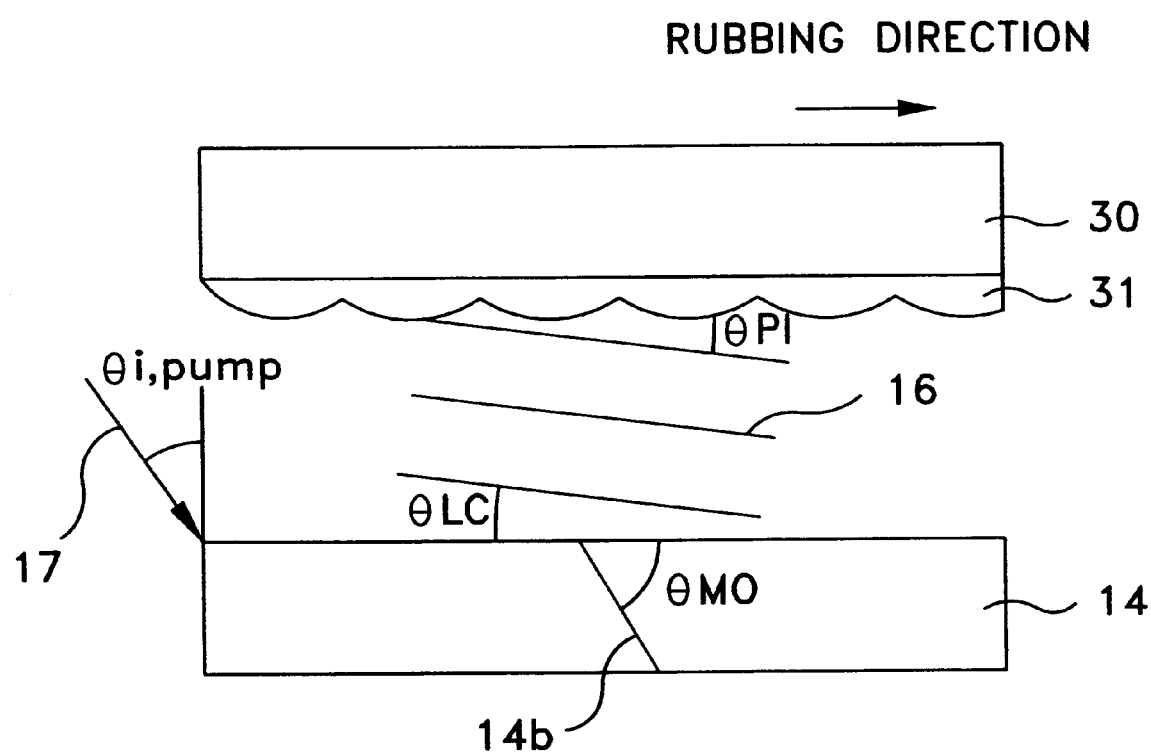
FIG. 9 shows a schematic sectional view so as to measure a pretilt angle of liquid crystal molecule according to oblique orientation of methyl orange molecules-containing polyvinyl polymeric film used as an aligning layer relative to circularly polarized light.

FIG. 9 shows a schematic sectional view for describing the measurement of a pretilt angle of liquid crystal according to oblique orientation of methyl orange molecules-containing polyvinyl polymeric film used as an aligning layer relative to circularly polarized light.

First, a reference sample is prepared by forming polyimide layer 31 on the substrate 30 with general rubbing method whereas a test sample is prepared by forming a methyl orange molecules-containing polyvinyl alcohol film 14 on other substrate(not shown). Circularly polarized light 17 is obliquely incident to a polymeric film 14, and thereby methyl orange molecules 14$b$ contained in a polymeric film 14 is obliquely oriented with a selected angle $\theta_{MO}$) with respect to a substrate surface by circularly polarized light 17. After pumping the methyl orange molecules-containing polyvinyl alcohol film 14, a liquid crystal cell is prepared and liquid crystal is then poured with isotropic state. At this time, due to oblique orientation of methyl orange molecules, liquid crystal molecules 16 adjacent the polymeric film is oriented with a selected pretilt angle ($\theta_{LC}$) with respect to the substrate surface.

If the pretilt angle of the liquid crystal poured into the liquid crystal cell manufactured by the above described method is measured using a general crystal rotation method, the relation between the pretilt angle of liquid crystal adjacent polyimide with respect to rubbing and the pretilt angle of the liquid crystal adjacent a methyl orange molecules-containing polymeric film with respect to circularly polarized light is described as the following equation (1).

$$(\theta_{PI}+\theta_{LC})/2 \approx (ne+no) \qquad (1)$$

wherein, $\theta$ is symmetry angle, ne and no are an extraordinary refractive index and an ordinary refractive index of the liquid crystal, respectively.

Therefore, $\theta_{LC}$ can be measured from the above approximation equation (1).

Figure 10:
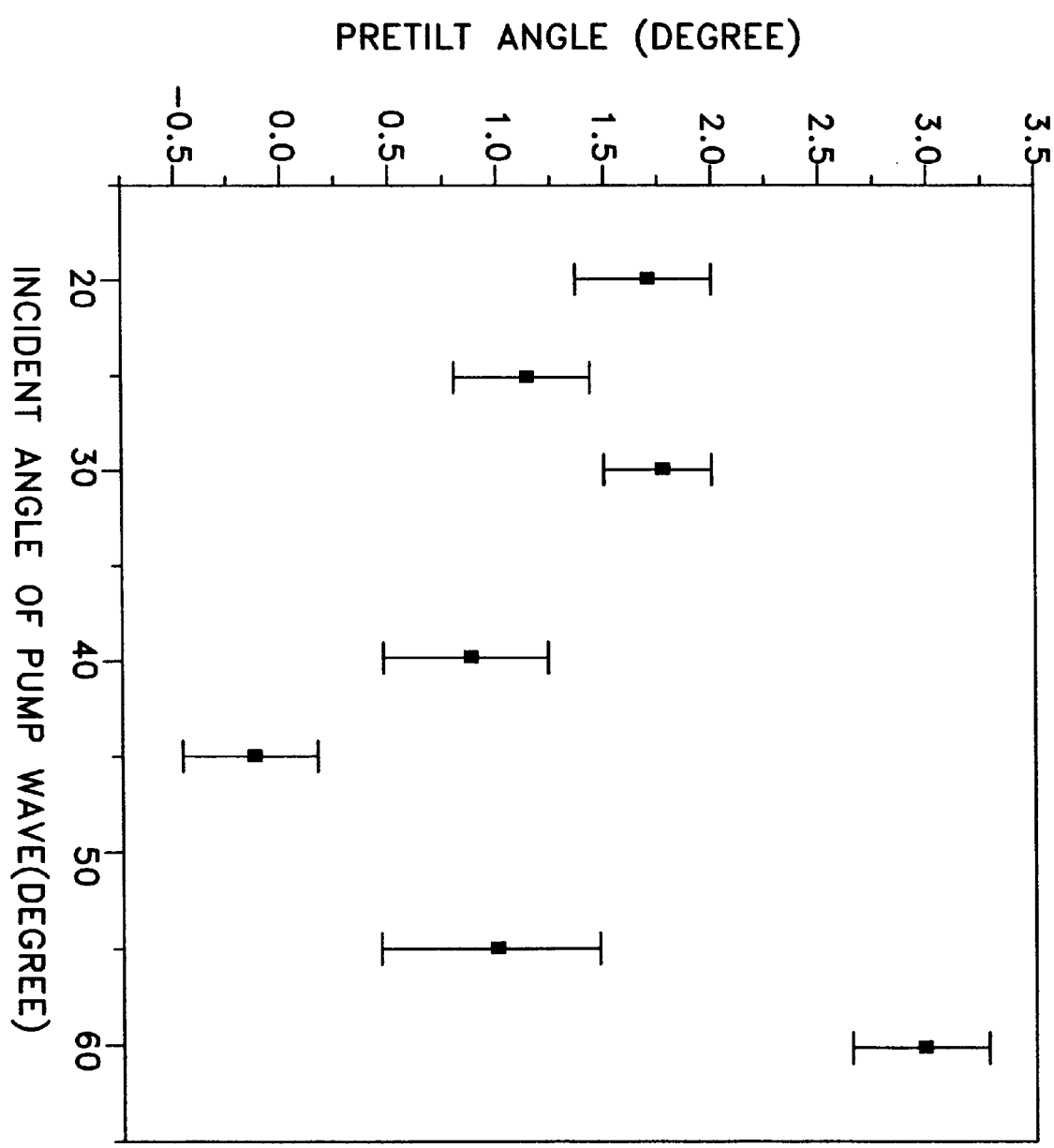
FIG. 10 shows the pretilt angle ($\theta_{LC}$) of liquid crystal adjacent methyl orange molecules-containing polyvinyl alcohol film as a function of an incident angle of pump wave circularly polarized, measured from the liquid crystal cell of FIG. 9.

FIG. 10 shows the pretilt angle ($\theta_{LC}$) of liquid crystal adjacent methyl orange molecules-containing polyvinyl alcohol film as a function of an incident angle of pump wave circularly polarized, measured from the liquid crystal cell of FIG. 9.

FIG. 10 showed that the pretilt angle of the liquid crystal decreased when the incident angle of pump wave is up to 45° whereas and it increased when the incident angle of pump wave ranges between 45° and 60°. Accordingly, we investigated that the pretilt angle of the liquid crystal can be controlled by changing the incident angle of pump wave circularly polarized.

Figure 11:
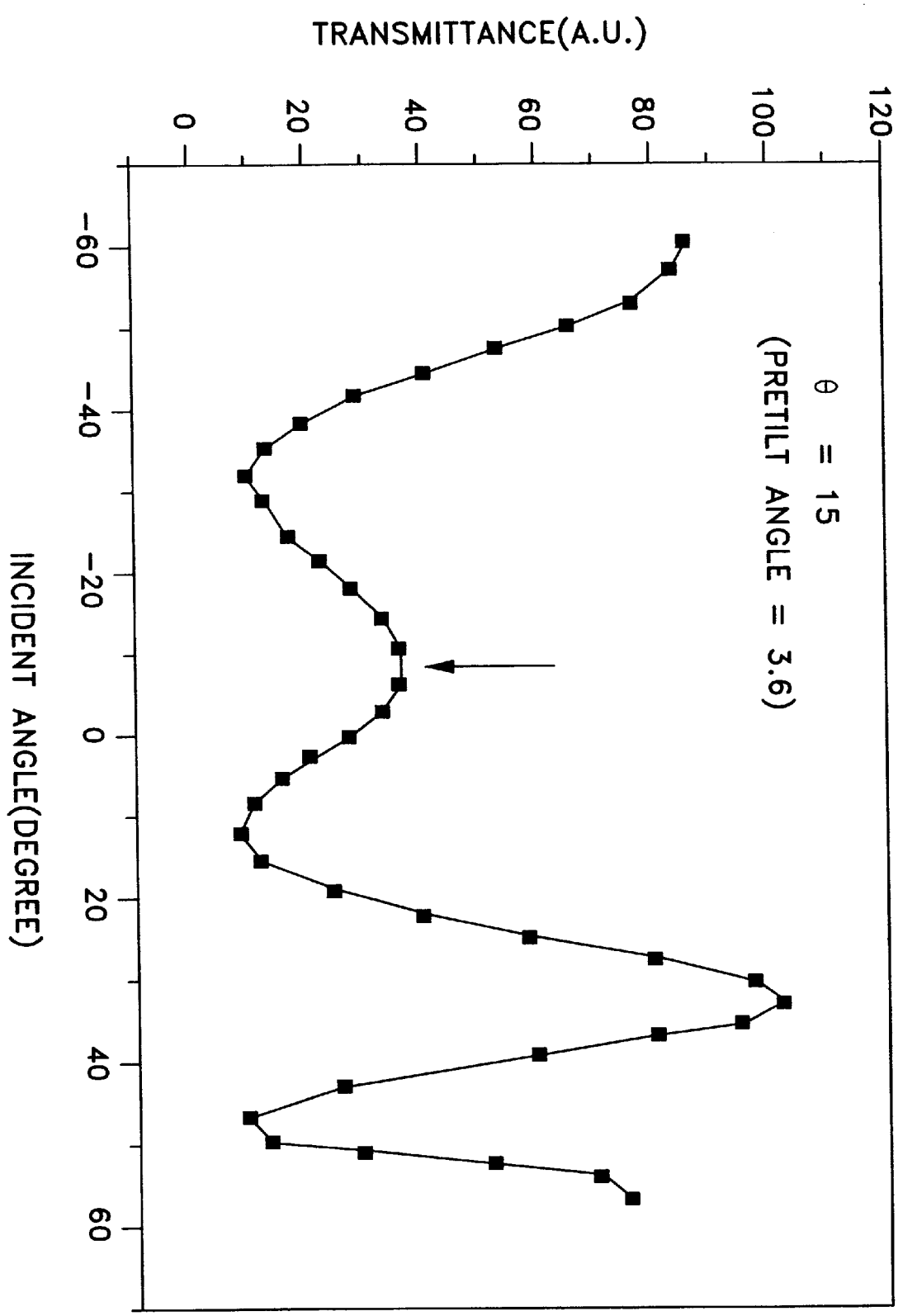
FIG. 11 shows the transmittance curve measured by a conventional crystal rotation method which is used so as to measure the pretilt angle, using the liquid crystal cell manufactured by irradiating circularly polarized light onto the methyl orange molecules-containing polyvinyl alcohol film and then placing the above polyvinyl alcohol as an aligning layer film on both surfaces of the liquid crystal substrates.

FIG. 11 show the transmittance curve measured by a conventional crystal rotation method which is used so as to measure the pretilt angle, using the liquid crystal cell manufactured by illuminating circularly polarized light on the methyl orange molecules-containing polyvinyl alcohol film and then placing the above polyvinyl alcohol film on each surface of the substrates as an aligning layer.

As shown in FIG. 11, the symmetry angle is 15°. Therefore, the pretilt angle of the liquid crystal is known to be 3.6°.

That is to say, it means that methyl orange molecules are obliquely aligned relative to the substrate surface by circularly polarized light having a selected incident angle and thus the liquid crystal is obliquely aligned with a selected pretilt angle relative to the substrate surface.

Figure 12:
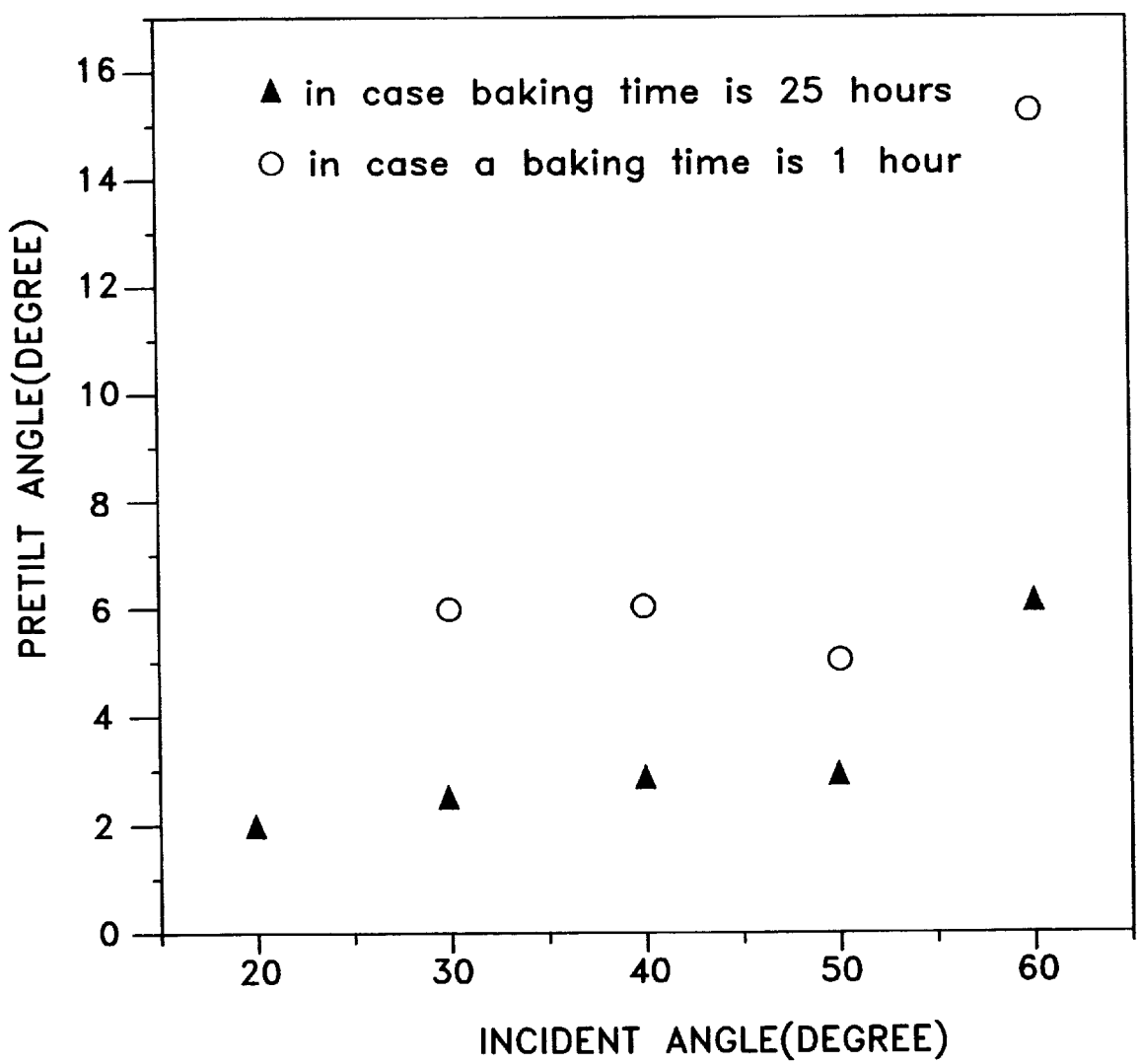
FIG. 12 shows the pretilt angle of the liquid crystal according to the incident angle of pump wave circularly polarized and according to the baking time of methyl orange molecule-containing polymeric film.

In the embodiments of this invention, in the case that the liquid crystal cell is manufactured by irradiating circularly polarized light onto the methyl orange molecules-containing polyvinyl alcohol film, the liquid crystal had a selected value of pretilt angle. As one of methods which control the pretilt angle, we investigated the method of changing the incident angle of pump wave. As shown in FIG. 12, the pretilt angle of the liquid crystal varied with the incident angle of pump wave circularly polarized and it also varied with the baking time of methyl orange molecules-containing polyvinyl alcohol film.

In addition, although using circularly polarized light for aligning the optically active compound-containing polymeric film is disclosed herein, elliptically polarized light provides the nearly same effect as the circularly polarized light in aligning the polymeric film. Therefore, it must be understood that the term circularly polarized light as used herein includes the meaning of elliptically polarized light. Moreover, the aligning layer formed on the substrate according to this invention may also be used in a liquid crystal display device, a phase modulator, a non-linear optical device, a spatial light modulator, etc.

Accordingly, in the liquid crystal cells according to the embodiments of this invention, the liquid crystal is obliquely aligned with a certain value of pretilt angle by using circularly polarized light as light source without the need to mechanically rub the substrate surface.

In the liquid crystal display devices according to the embodiments of this invention, a damage of TFT underlying an aligning layer can be prevented by using circularly polarized light incident to azoic dye-containing polymeric film used as an aligning layer to align liquid crystal molecules. In addition, as there is no need to rub the substrate surface, dust particles arising from a rubbing cotton can not occur. Accordingly, the yield of the liquid crystal cell is improved and the lifetime of LCD can be extended.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of aligning an optically active compound-containing polymeric film on a substrate comprising irradiating circularly polarized light onto the optically active compound-containing polymeric film and thus obliquely aligning the optically active compound.

2. The method of claim 1, wherein the aligning angle of the optically active compound varies with an incident angle of the circularly polarized light incident to the polymeric film.

3. The method of claim 1, wherein the polymeric film contains an azoic dye as the optically active compound.

4. The method of claim 1, wherein the polymeric film is polyvinyl alcohol film which contains methyl orange as the optically active compound.

5. A method of aligning liquid crystals comprising the steps of:
   (a) forming an optically active compound-containing polymeric film to be used as an aligning layer on a surface of each of a lower substrate and an upper substrate;
   (b) irradiating circularly polarized light on the polymeric film to obliquely align the optically active compound contained relative to the substrate surface to form the aligning layer;
   (c) positioning the lower substrate and the upper substrate opposite to each other such that the polymeric film on the lower substrate is opposite to the polymeric film on the upper substrate; and
   (d) pouring a liquid crystal between the substrates, thereby to obliquely align molecules of the liquid crystal due to the optically active compound aligned.

6. The method of claim 5, wherein a pretilt angle of the liquid crystal is controlled by an aligning angle of the optically active compound which is controlled by an incident angle of circularly polarized light.

7. The method of claim 5, wherein the optically active compound is an azoic dye.

8. The method of claim 5, wherein the aligning layer is a polyvinyl alcohol film which contains methyl orange as the optically active compound.

9. A method of aligning liquid crystals comprising the steps of:
   (a) forming an optically active compound-containing polymeric film to be used as an aligning layer on a surface of each of a lower substrate and an upper substrate;
   (b) positioning the lower substrate and the upper substrate in opposite to each other such that the polymeric film on the lower substrate is opposite to the polymeric film on the upper substrate;
   (c) pouring a liquid crystal between the substrates; and
   (d) irradiating circularly polarized light on the polymeric film to obliquely align the optically active compound relative to the substrate surface, thereby to obliquely align molecules of the liquid crystal in accordance with the optically active compound aligned.

10. The method of claim 9, wherein a pretilt angle of the liquid crystal is controlled by an aligning angle of the optically active compound which is controlled by an incident angle of the circularly polarized light.

11. The method of claim 9, wherein the optically active compound is an azoic dye.

12. The method of claim 9, wherein the aligning layer is a polyvinyl alcohol film which contains methyl orange as the azoic dye.

13. A method of fabricating a liquid crystal cell by aligning liquid crystal comprising the steps of:
   (a) forming an optically active compound-containing polymeric film to be used as an aligning layer on a surface of each of a lower substrate and an upper substrate;
   (b) irradiating polarized light on the polymeric film to obliquely align the optically active compound relative to the substrate surface;
   (c) placing the lower and upper substrates such that the lower and upper substrates are opposite to each other with a selected space;
   (d) sealing the lower and upper substrates with a spacer placed between the substrates; and
   (e) pouring a liquid crystal between the substrates, thereby to obliquely align the liquid crystal such that the liquid crystal have a certain selected pretilt angle in accordance with the aligning angle of the optically active compound.

14. The method of claim 13, wherein a pretilt angle of the liquid crystal is controlled by an aligning angle of the optically active compound which is controlled by an incident angle of the circularly polarized light.

15. The method of claim 13, wherein the optically active compound is an azoic dye.

16. The method of claim 15, wherein the aligning layer is a polyvinyl alcohol film which contains methyl orange as the azoic dye.

17. The method of claim 16, wherein the step of forming the methyl orange-containing polymeric film on the substrate surfaces comprising the steps of:

dissolving a polyvinyl alcohol powder in distilled water to prepare a solution;

adding a selected amount of methyl orange into the solution;

pouring the solution into which the methyl orange is added onto the substrate surfaces thereby to coat the substrate surfaces; and baking the coated substrates to form the polymeric films.

18. The method of claim 17, wherein the pretilt angle of the liquid crystal varies with the baking time of the substrates in the baking step.

19. A method of fabricating a liquid crystal cell by aligning liquid crystal comprising the steps of:

(a) forming an optically active compound-containing polymeric film to be used as an aligning layer on a surface of each of a lower substrate and an upper substrate;

(b) placing the lower and upper substrates such that the lower and upper substrates are opposite to each other with a selected space;

(c) sealing the lower and upper substrates with a spacer placed between the substrates;

(d) irradiating circularly polarized light on the polymeric film to obliquely align the optically active compound relative to the substrate surface; and (e) pouring a liquid crystal between the substrates, thereby to obliquely align the liquid crystal such that the liquid crystal has a certain selected pretilt angle in accordance with the aligning angle of the optically active compound;

wherein the pretilt angle of the liquid crystal is controlled by the aligning angle of the optically active compound which is controlled by an incident angle of the circularly polarized light.

20. The method of claim 19, wherein the optically active compound is an azoic dye.

21. The method of claim 20, wherein the aligning layer is a polyvinyl alcohol film which contains methyl orange as the azoic dye.

22. The method of claim 21, wherein the step of forming the methyl orange-containing polymeric film on the substrate surfaces comprising the steps of:

dissolving a polyvinyl alcohol powder in distilled water to prepare a solution;

adding a selected amount of methyl orange into the solution;

pouring the solution into which the methyl orange is added onto the substrate surfaces thereby to coat the substrate surfaces; and baking the coated substrates to form the polymeric films.

23. The method of claim 22, wherein the pretilt angle of the liquid crystal molecule varies with the baking time of the substrates in the baking step.

24. A method of fabricating a liquid crystal cell by aligning liquid crystal comprises the steps of:

(a) forming an optically active compound-containing polymeric film to be used as an aligning layer on a surface of each of a lower substrate and an upper substrate;

(b) placing the lower and upper substrates such that the lower and upper substrates are opposite to each other with a selected space;

(c) scaling the lower and upper substrates with a spacer placed between the substrates;

(d) pouring the liquid crystal between the substrates; and (e) irradiating circularly polarized light on the polymeric film to obliquely align the optically active compound relative to the substrate surface, thereby to obliquely align the liquid crystal such that the liquid crystal has a certain selected pretilt angle in accordance with the aligning angle of the optically active compound, wherein the pretilt angle of the liquid crystal is controlled by the aligning angle of the optically active compound which is controlled by an incident angel of the circularly polarized light.

25. The method of claim 24, wherein the optically active compound is an azoic dye.

26. The method of claim 25, wherein the aligning layer is a polyvinyl alcohol film which contains methyl orange as the azoic dye.

27. The method of claim 26, wherein the step of forming the methyl orange-containing polymeric film on the substrate surfaces comprises the steps of:

dissolving a polyvinyl alcohol powder in distilled water to prepare a solution;

adding a selected amount of methyl orange into the solution;

pouring the solution into which the methyl orange is added onto the substrate surfaces thereby to coat the substrate surfaces; and baking the coated substrates to form the polymeric films.

28. The method of claim 27, wherein the pretilt angle of the liquid crystal molecule varies with the baking time of the substrates in the baking step.

* * * * *

UNITED STATES PATENT AND TRADEMARK OFFICE
CERTIFICATE OF CORRECTION

PATENT NO. : 6,184,958 B1
DATED : February 6, 2001
INVENTOR(S) : Lim et al.

It is certified that error appears in the above-identified patent and that said Letters Patent is hereby corrected as shown below:

Column 1,
Line 38, please cancel "0" and substitute -- $\theta$ -- therefor.

Column 3,
Line 59, after "baking step", please cancel "," and substitute -- . -- therefor.

Column 5,
Line 5, please insert -- ) -- after "(8A".

Column 10,
Line 10, after "selected angle", please insert -- ( -- prior to "$\theta_{MO}$"; and
Line 30, please cancel and substitute therefor -- $(\theta_{PI} + \theta_{LC})/2 \approx \theta/(ne + no)$     (1) --.

Column 12,
Line 19, please cancel "in" prior to "opposite";
Line 43, after "irradiating", please insert -- circularly --; and
Line 67, please change "comprising" to -- comprises --.

Column 14,
Line 15, please cancel "scaling" and substitute -- sealing -- therefor.

Signed and Sealed this

Twenty-sixth Day of November, 2002

*Attest:*

*Attesting Officer*

JAMES E. ROGAN
*Director of the United States Patent and Trademark Office*